June 2, 1942.     F. J. WESTROPE     2,284,784
VISOR
Filed Nov. 28, 1940
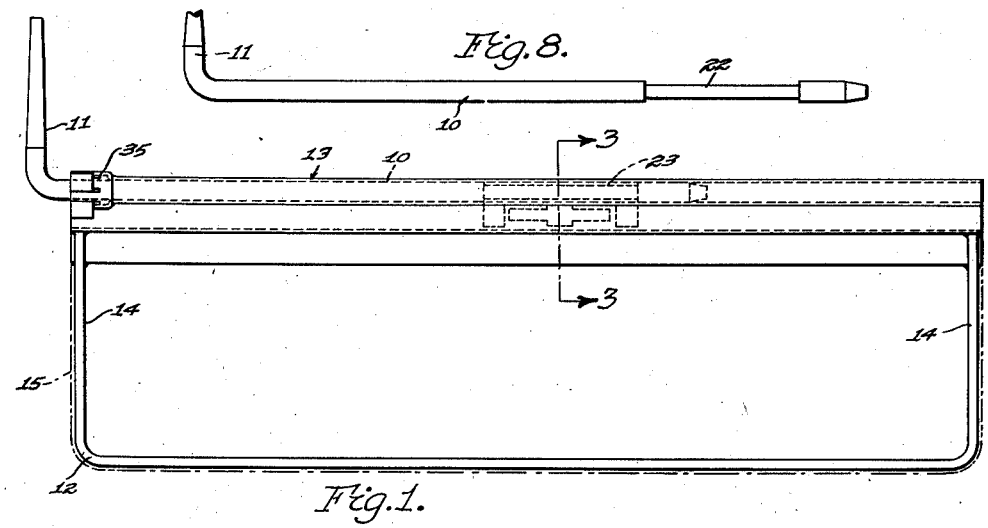
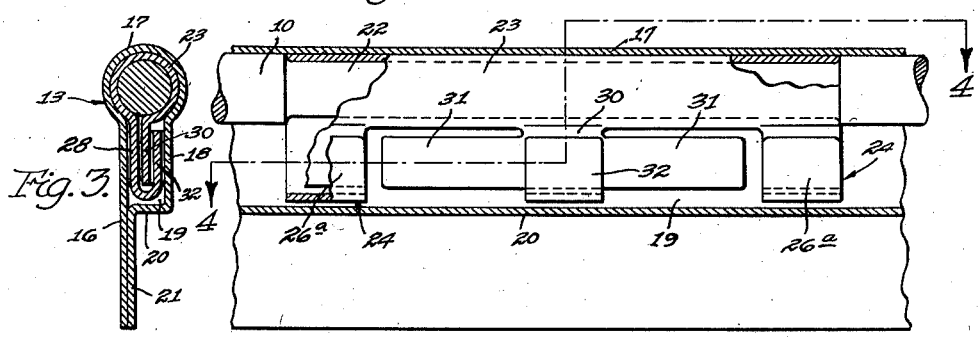
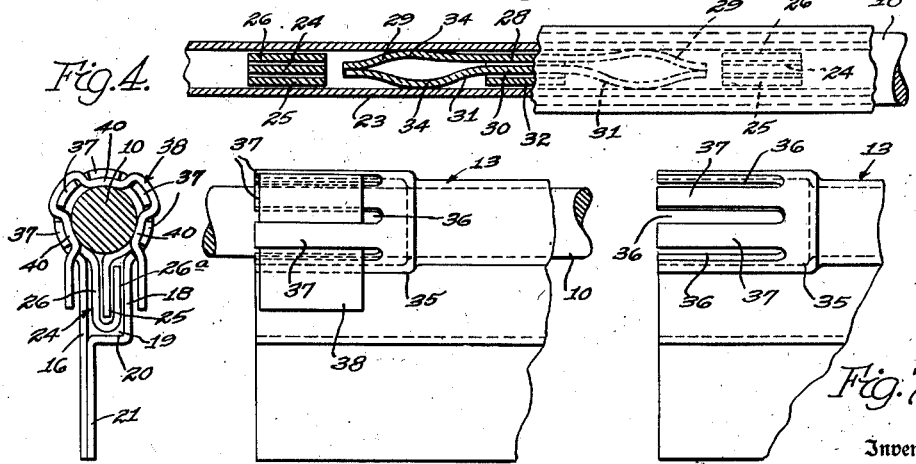
Inventor
Frederick J. Westrope Patented June 2, 1942

2,284,784

UNITED STATES PATENT OFFICE 2,284,784

VISOR

Frederick J. Westrope, Pleasant Ridge, Mich., assignor, by mesne assignments, to Reconstruction Finance Corporation, Detroit, Mich., a corporation of the United States Application November 28, 1940, Serial No. 367,511

6 Claims. (Cl. 296—97)

This invention relates generally to visors and more particularly to adjustable visors for motor vehicles.

One of the objects of the present invention is to provide a new and improved visor or glare shield which is easily movable relatively to its support to various positions of adjustment and yet one which will not rattle.

Another object of the invention is to provide for a visor or glare shield which is movable about an axis of a supporting rod to desired positions of adjustment and is also shiftable along the rod to other positions of adjustments, new and improved means for releasably holding the shield in positions of adjustment.

A further object of the invention is to provide a shield of the above mentioned character having means to prevent rattling noises between the shield and its support and also to aid in holding the shield in positions of adjustment.

A still further object of the invention is to provide a shield of the above mentioned character which is adjustable to various positions without developing rattling noises and yet one which is inexpensive to manufacture.

Other objects of the invention will become apparent from the following detailed description taken in connection with the accompanying drawing, in which:

Figure 1 is a front elevational view of the visor structure.

Figure 2 is an enlarged fragmentary side view of the visor structure having parts broken away and in section to show certain details of construction.

Figure 3 is a cross-sectional view of the visor structure taken along the line and in the direction of the arrows 3—3 of Figure 1.

Figure 4 is a top fragmentary view partly in section to show certain details of the visor structure and taken along the line 4—4 of Figure 2.

Figure 5 is an enlarged fragmentary view in elevation of one end of the visor structure.

Figure 6 is an end view of the visor structure looking from left to right of Figure 5.

Figure 7 is an enlarged fragmentary view of the visor shield shown removed from the associated parts of the structure.

Figure 8 is a side view of a supporting rod for the visor or shield.

Referring to the drawing by characters of reference, the visor structure shown includes a supporting rod 10 having a bent end portion 11 provided for connection to a bracket, not shown but which may be of any suitable type for attaching the rod to and in a suitable location within a motor vehicle body. In the present instance, the visor shield includes a preferably rectangular frame 12 of which one or the upper side thereof comprises a sheet metal tube, designated in general by the numeral 13. The upper ends of the frame side members, as at 14, may be welded or be otherwise suitably secured to the upper frame side member 13 and the frame may be covered by fabric, indicated by the dot-and-dash line 15, or by any other suitable material. As shown in Figure 3, the upper frame member or tube 13 is formed from a single metallic sheet of rectangular shape, having a longitudinal flange 16 depending from a tubular portion 17 in which the rod 10 is slidably received. From the tubular portion 17, the sheet metal is bent back and extends downwardly, as at 18, providing a wall in spaced relation to the wall or flange 16, thus providing a channel 19 which extends preferably coextensive with and below the tubular-shaped portion 17. Also, as shown in Figure 3, the wall 18 is preferably offset, as at 20, to engage the flange 16, to which a lower border portion or flange 21 may be welded or be otherwise suitably secured.

Intermediate its ends, the shaft 10 is provided with a reduced portion 22 to receive a tubular member 23 which is preferably formed of flexible sheet metal. The tube 23 is provided at opposite ends thereof with depending extended portions 24 which project downwardly and freely into the channel 19 of the tubular frame member 13. The extended portions 24 are formed by bending a longitudinal flange or border portion 25 of the sheet metal downwardly from the tubular portion 23 and bending an opposite flange or border portion 26 of the metallic sheet downwardly and back, as at 26a, in overlapping relation with the flange 25. The flange 26 and its upturned end portion 26a are spaced from opposite sides of the flange 25 for a purpose to be hereinafter described in detail. It will be noted that the flange 26 and its upturned end portion 26a are spaced such that they will be free in the channel 19 or such that the shield may be shifted longitudinally along the rod 10 without resistance from the extended portions 24.

Intermediate the longitudinally spaced extended portions 24 a depending portion 28 of the tube 23 extends into the channel 19 and integral with the portion 28 there is a pair of spring fingers 29 extending in opposite directions longitudinally of and within the channel 19. Similarly, an extended portion 30 extends from the other edge of the tube 23 into the channel 19 and carries a pair of oppositely extending spring fingers 31 which are similar to the spring fingers 29. An extended portion or integral tab 32 extends substantially midway from the ends of the spring fingers 28 and is bent up around the spring 31 intermediate the ends thereof. Corresponding ends of the springs 29 and 31 have engaging end portions and intermediate their ends the spring fingers are bowed outwardly, as at 34, see Figure 4, to engage the opposed inner wall surfaces of the channel 19. The spring portions 28 and 32 are spaced from opposite sides of the depending tab portion 30 providing for tightening of the tube portion 23 around the reduced shaft portion 22 when the shield is moved about the axis of the rod 10. The spring fingers 29, 31 engaging the opposed wall surfaces of the channel 19 provide frictional force to hold the shield in any desired position of adjustment along or around the supporting rod 10.

The frame tube 17 is provided with an enlarged end portion 35, adjacent the rod bent end portion 11, and this enlarged end portion 35 is provided with spaced, longitudinally extending slots 36 which run out of the end of the tube providing a plurality of radially spaced spring fingers 37 spaced from the periphery of the rod 10. Interwound or laced in and out between the fingers 37 there is a strip of sound-deadening material 38, which is preferably slightly compressible and may be leather. This leather strip is carried by and held to the tube 17 solely by the interlacing relationship with the spring fingers 37 and presents radially spaced leather portions 40 for engaging the periphery of the rod 10 to prevent rattling noises between the rod and shield tube and also aid in holding the shield in adjusted positions. The thickness of the leather strip 38 is such that it forces the spring fingers 37 outwardly, thus holding the fingers under tension. This increases the frictional force between the leather strip and the rod 10 and compensates for wear of the leather strip since the spring fingers will move inwardly as wear takes place.

While a specific embodiment of the invention has been described and illustrated, it will be understood that various modifications may be made within the scope of the appended claims without departing from the spirit of the invention.

What I claim is:

1. A visor structure for motor vehicles comprising, a supporting rod for attachment to a vehicle, a shield member carried by and having a tubular portion receiving said rod, said shield member being movable relatively to said rod to different positions of adjustment, said tubular portion having radially spaced spring fingers at one end thereof, and a strip of sound-deadening material interwound in said fingers and engaging the periphery of said rod to prevent rattling noises between said rod and said tubular portion.

2. A visor structure for motor vehicles comprising, a supporting rod for attachment to a vehicle, a shield supported by and having a tubular portion receiving said rod, said shield member being movable relatively to said rod to desired positions of adjustment, said tubular portion having an enlarged end portion slotted longitudinally to provide a plurality of spring fingers, and a strip of sound-deadening material interlaced with said fingers providing inner spaced portions of said material for contact with the periphery of said rod, said material holding said spring fingers outwardly under tension to compensate for wear of said material.

3. A visor structor for motor vehicles comprising, a supporting rod for attachment to a vehicle, a shield supported by and having a tubular portion receiving said rod, said shield member being movable relatively to said rod to desired positions of adjustment, said tubular portion having an enlarged end portion slotted longitudinally to provide a plurality of spring fingers, and a strip of sound-deadening material interlaced with said fingers providing inner spaced portions of said material for contact with the periphery of said rod, said material holding said spring fingers outwardly under tension to compensate for wear of said material, said strip of material being held in place against longitudinal movement by said spring fingers.

4. A visor structor for motor vehicles comprising, a supporting rod for attachment to a vehicle, a shield supported by and having a tubular portion receiving said rod, said shield being movable about the longitudinal axis of said rod to positions of adjustment and also being shiftable along said rod to other positions of adjustment, said tubular portion having an longitudinally-disposed extension with parallel inner walls offset laterally from said rod, a tubular member surrounding said rod within said tubular portion, and spring means carried by said tubular member and projecting into said tubular portion extension into engagement with the inner wall surfaces of said tubular portion extension, said spring means being held under tension whereby to hold releasably said shield member in positions of adjustment.

5. A visor structure for motor vehicles comprising, a supporting rod for attachment to a vehicle, a shield supported by said rod, said shield having a tubular portion to receive said rod and having a channel extending longitudinally of and open to said tubular portion, said shield being movable about the longitudinal axis of said rod to desired positions of adjustment and also being shiftable along said rod to other positions of adjustment, a tubular member surrounding said rod within said tubular portion of said shield and having an extension projecting into but spaced from opposed inner wall surfaces of said channel, and spring means carried by said extension and held under tension against the opposed inner wall surfaces of said channel to hold said shield in desired positions of adjustment.

6. A visor structure for motor vehicles comprising, a supporting rod for attachment to a vehicle, a shield supported by said rod, said shield having a tubular portion to receive said rod and having a channel extending longitudinally of and open to said tubular portion, said shield being movable about the longitudinal axis of said rod to desired positions of adjustment and also being shiftable along said rod to other positions of adjustment, a tubular member surrounding said rod within said tubular portion of said shield and having an extension projecting into but spaced from opposed inner wall surfaces of said channel, spring means carried by said extension and held under tension against the opposed inner wall surfaces of said channel to hold said shield in desired positions of adjustment, and means carried by said tubular portion in engagement with said rod to aid in holding said shield in positions of adjustment and also prevent rattling between said tubular portion and said rod.

FREDERICK J. WESTROPE.